May 31, 1960 P. J. F. CHRISTIE 2,938,229
DEVICES FOR THE ORIENTATION OF FISHES
Filed July 30, 1957 3 Sheets-Sheet 1
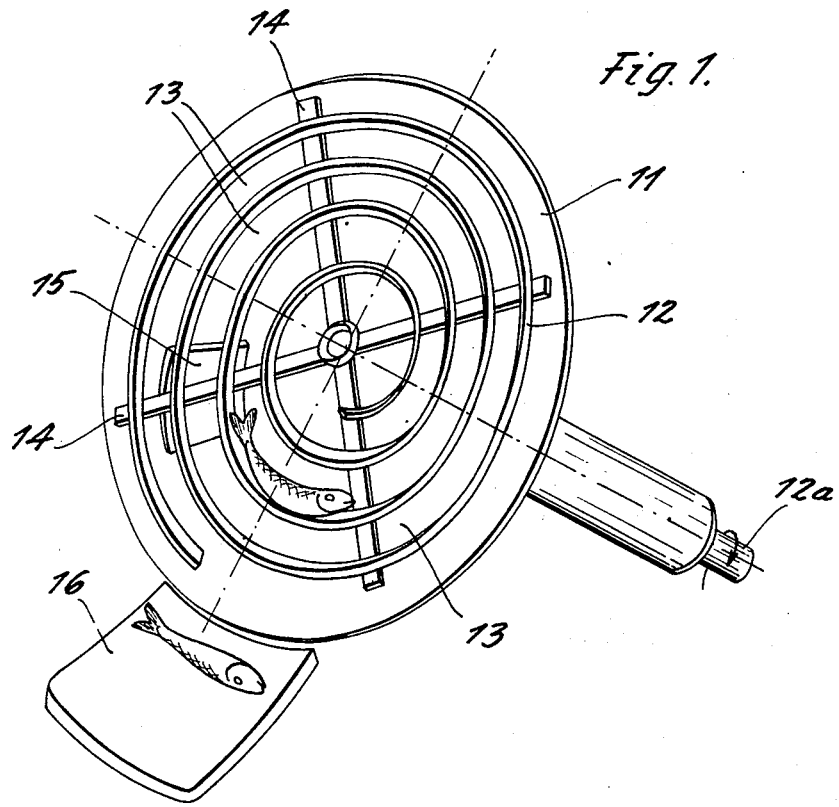
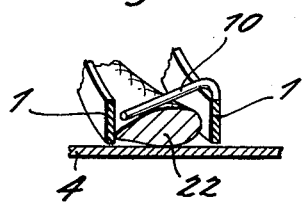
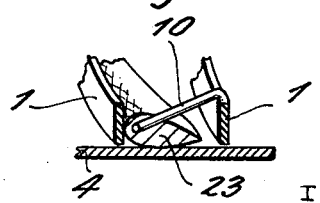
INVENTOR:
Peter J. F. Christie
BY
Richards y Geier
ATTORNEYS

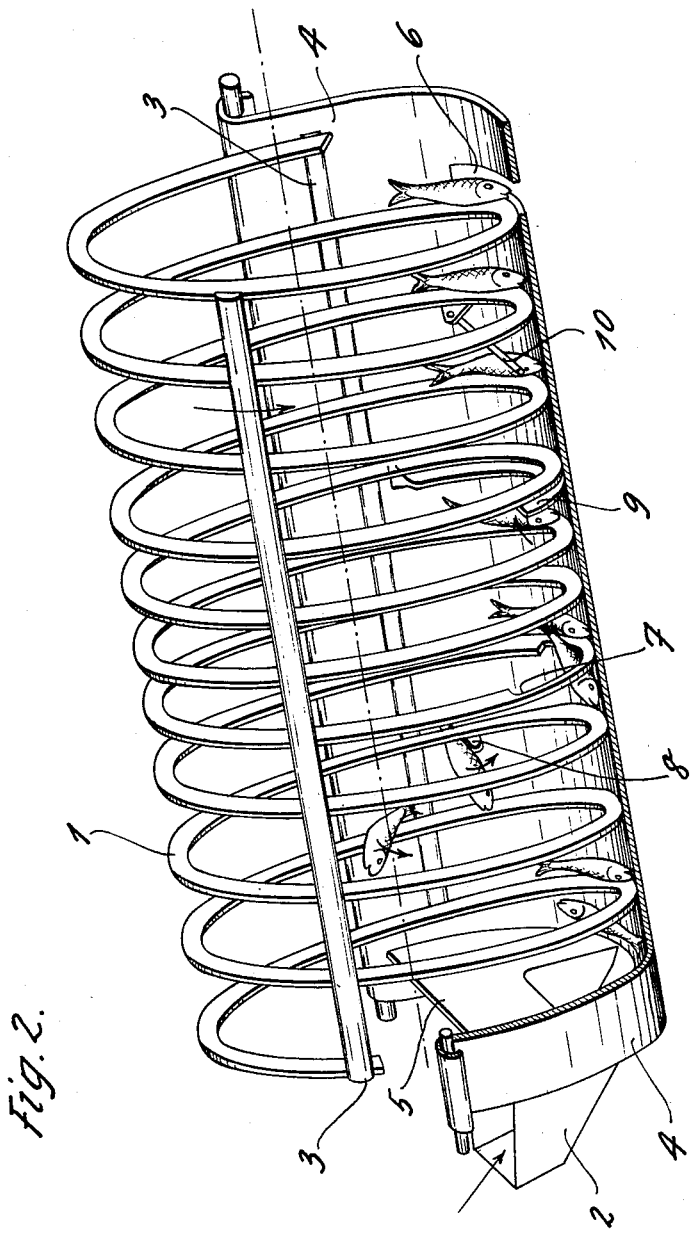

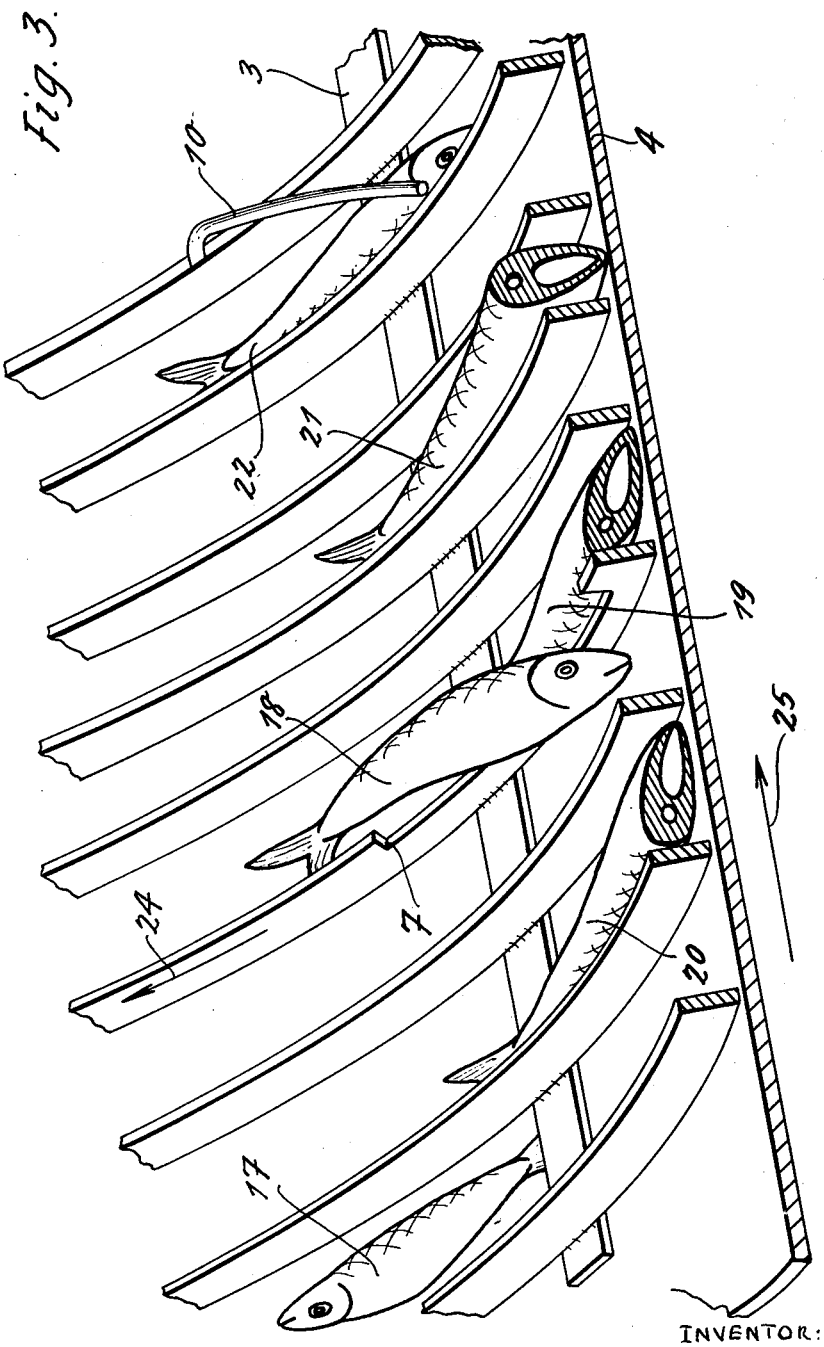

United States Patent Office 2,938,229
Patented May 31, 1960

2,938,229
DEVICES FOR THE ORIENTATION OF FISHES

Peter J. F. Christie, Lubeck, Germany, assignor to Nordischer Maschinenbau Rud. Baader, Lubeck, Germany Filed July 30, 1957, Ser. No. 675,071

5 Claims. (Cl. 17—2)

The invention relates to a device for the orientation of fishes with conveyor means shifting the fish transversely to its longitudinal direction and consists in that the conveyor means, moving substantially in the longitudinal direction of the fishes, form guide channels of variable cross-section and cooperate with a support, the conveyor means and the support being movable relatively to each other transversely to the longitudinal direction of the fishes.

A determining factor for the quantitative and qualitative output of any fish dressing machine is that the fishes are fed to the machine in like oriented position, that is belly or back and head or tail of all the fishes fed must lie in the same direction. The simplest means of obtaining the like orientation is to introduce the fishes by hand. It is, however, obvious that introducing the fishes by hand, if it is done carefully, must necessarily be a relatively slow process. This means a lower quantitative output for the fish dressing machine, which cannot be justified in view of the present day demand for high performance machines.

It has therefore been endeavoured to bring the fishes into a certain position mechanically, but hitherto this has not led to a satisfactory result either as regards the output or the efficiency. The primary reason for this is that—just as in the case of hand introduction—it is difficult to combine high output with perfect work. The most effective method has proved to be to shift the fishes transversely to the longitudinal direction, while at the same time influencing the position of the fish in the longitudinal direction, but it has not led to the desired result as regards output because the devices operate too sluggishly owing to the relatively rigid guiding of the fishes. In addition, devices in which the work is carried out with the aid of water jets, are too complicated and uneconomical.

It has now been found that a satisfactory solution to the problem is possible if the fish is guided as loosely as possible and in other respects utilizing to a great extent its characteristics, particularly the shape of its head and tail, the distribution of weight, its scales and fins etc. for the orientation operation.

If, according to the invention, the conveyor means are given the shape of guide channels with variable cross section and if these channels cooperate with a support carrying the fishes, the conveyor means and the support being movable relatively to each other transversely to the longitudinal direction of the fishes, an excellent effect is obtained because the orientation of the fishes takes place easily. The orientation as regards the belly position is obtained substantially by the change in the cross-section of the guide channels, it being possible to improve this effect by means which separate out fishes lying in the wrong direction and return them once more into the process at a point further back in the device.

For orienting the fish in the longitudinal direction, the conveyor means may be interconnected by cross-bars which preferably form grippers with the support which carry along and sort out the fish arriving in them tail first.

In order to separate fishes lying on top of each other in the guide channels, the guide channels are made lower in height at one or several points, so that piled up fishes are separated out into the neighbouring guide channel.

However, since after orienting according to the desired belly position fishes can nevertheless be in the wrong position when they are about to leave the device, feelers projecting into the guide channels can be provided at one or several places and form with the walls of the guide channels and the support a cross-section allowing a fish lying in a certain position to pass, whereas a fish wrongly positioned is carried along and sorted out or returned once more to an earlier stage of the process.

An advantageous construction of the device consists of a rotary arrangement of the conveyor means. In that case the shape of a rotary helix of short radial height is particularly advantageous. At the same time the support is preferably also constructed as a cylindrical or truncated conical casing or shell entirely or partly surrounding the helix.

A rubberized fabric or a foil of synthetic material, the tension of which can be regulated, preferably is used as material for the support.

To facilitate the re-introduction of the sorted out fishes at an earlier stage of the process, the conveyor path of the device is caused to ascend in the direction in which the fishes are fed. In the case of rotary conveyor devices the longitudinal axis of the device rises in the direction in which the fishes are fed.

Two embodiments of the invention are illustrated by way of example in the accompanying drawings, these examples being diagrammatic and free from parts not directly associated therewith so as to make them easier to understand.

In the drawings:

Fig. 1 shows a form of construction with a flat support and spiral conveyor means;

Fig. 2 shows a form of construction with conveyor means constructed as a rotary helix;

Fig. 3 is a section of Fig. 2 on an enlarged scale, showing the individual orienting operations;

Fig. 4 is a cross-section through a guide channel with feeler projecting therein for controlling the belly position, and Fig. 5 is a similar cross-section of Fig. 4 with the feeler and a wrongly positioned fish.

The construction illustrated in Fig. 1 is a diagrammatic representation of a simple form of the device according to the invention in which the fishes are oriented and separated according to their belly position; whereas the orientation according to the position of the head is effected in such a manner that fishes lying the wrong way round in relation to the position of the head are ejected from the device and immediately reintroduced at the admission point. The head position is not directly influenced in this device.

The device comprises a circular stationary disc 11 on which a rotary spiral 12 driven from a driving drum 12a is arranged. The spiral 12 consists of a band-like element the windings of which form between them guide channels 13, the cross-section of which is, according to the invention, varied in that the distance between the windings increases or decreases. The spiral 12 is held by two cross bars 14 arranged in cross shape which are located between the spiral 12 and the circular disc 11 at such a distance from the latter that it forms therewith gripping means in which the tail of the fish can enter. An aperture 15 is provided at one point of the circular disc and serves for separating out the fishes which are wrongly positioned as regards the direction of the head. A lead-off device in the form of a chute 16 is also provided.

The device operates in such a manner that the fishes fed at the centre of the spiral 12 while it is rotating, enter the channels 13 and pass on to the disc 11 in radial direction to the lead-off device 16. It is easy to ensure that the fishes can travel only in the direction towards the lead-off point by arranging the device at a slight incline. By narrowing the guide channels 13, the fishes are turned on to their bellies and on leaving the guide channels drop directly in the same direction so that they leave the device all in the same belly position.

The gripper means formed by the bars 14 and the support 11 ensure the same head position. If a fish lies in the position shown in Fig. 1 in one of the guide channels and the spiral rotates in clockwise direction, the fish slides head foremost over the bar 14 and is carried onwards in this position in radial direction. If, however, the fish lies with its head in the direction in which the spiral 12 rotates, its tail will enter the gripper and is carried along by the spiral. As soon as the fish reaches the aperture 15 in the disc 11 it drops out of the device and can again be introduced into the device. In this manner the fishes leave the device down the chute 16 all in the same belly and head position.

The device illustrated in Figs. 2 to 5 comprises a rotary cylindrical helix 1, the spires of which form between them guide channels. The helix is rotatable and mounted with its longitudinal axis so situated that it ascends from the inlet 2 to the outlet end. The spires of the helix 1 are interconnected by cross-bars 3 two of which are provided in the example illustrated. The helix is surrounded by a shell 4 of rubberized fabric, synthetic foil or the like, which in the example illustrated slightly exceeds a half shell. The front end of the shell 4 is closed by a wall 5 in which the inlet chute 2 terminates. The discharge end of the device is provided with an aperture 6 in the support for leading off the like oriented fishes which can then pass to any fish dressing machine or are conducted to a conveyor device.

The radial height of the helix spires is slight but is kept somewhat lower at one or more points, for example at 7. The helix 1 is provided with an abutment 8 at one or more points, which abutments serve for separating out the fishes not between but over the spires of the helix. Furthermore the guide channel formed by the spires of the helix is narrowed at one point by a guide member 9, the spacing of the spires being kept narrower so as to orient the fishes according to the belly. The orientation according to the belly is effected, as will be hereinafter described, in order to obtain a like oriented belly position at the outlet end. To be able to control the correct belly position near the outlet end a check feeler 10 projecting into the guide channel is provided which sorts out the fishes in the wrong belly position and returns them into the orientation process at an earlier stage for establishing the correct belly position.

The device operates in the following manner:

The fishes to be oriented according to the head and belly position are introduced into the device by the inlet chute 2 and drop indiscriminately on to the support 4 or the spires of the helix 1. Owing to the turning movement of the helix 1 they are pushed slowly on the support 4 towards the outlet end of the device. The fishes are thereby brought into their longitudinal direction in the guide channels formed by the spires of the helix. Fishes whose heads are in the opposite direction to that in which the helix 1 rotates remain in this position because the friction of the scales, fins and the tail against the helix spires and the support is very slight and the fishes slide head first over the abutments formed by the cross-bars 3. If a fish lies with its tail in the opposite direction to that in which the helix 1 moves, it is carried along by the friction of the scales, fins and tail against the spires of the helix and by the action of the cross-bars 3 which act as grippers because the tail pushes its way between a cross-bar 3 and the support 4. When a fish has been raised to about the height of the axis of rotation it tips over under the action of gravity and again falls back into the guide channel. It now lies in the right longitudinal direction, that is with its head pointing in the opposite direction to that in which the helix rotates, and will be pushed towards the discharge or outlet end of the device without being further influenced. If, however, the fish still lies the wrong way round, the procedure just described repeats itself until the fish lies in the correct position.

When fishes are not located in the guide channel but lie over the helix spires, they are carried along by the abutments 8 and drop into a guide channel in which, if they are in the correct longitudinal position, they are moved on or, if they are in the wrong longitudinal position, are brought into the correct longitudinal position by the procedure above described.

Should two or more fishes lie one on the other in a channel, these can be separated by reducing the radial height of the helix spires at 7, because at this point only the lowermost fish remains where it is, while the remaining fishes slide into the preceding guide channel.

When all the fishes have been brought into the proper longitudinal position, the orientation according to the belly position takes place. For this purpose the fishes are first stood on their bellies by a narrowing of the guide channels. When this has been done the fishes lying on their bellies automatically tip in the same direction when the guide channel again widens, so that they are all in the same belly position, that is with the belly facing away from the direction of feed.

Should some fishes still be in the wrong longitudinal direction as they approach the outlet, these can still be brought into the correct longitudinal position under the action of friction and the cross-bars 3. Fishes which still lie in the wrong belly position are sorted out by the check feeler 10 and returned into the working process at an earlier stage.

So as to show more clearly the individual stages of the procedure a section of the helix 1 and the support 4 is illustrated on an enlarged scale in Fig. 3. These individual stages are illustrated by showing six fishes. While some of the fish are shown decapitated in Fig. 3, this does not mean that the fishes are introduced into the device without heads, but serves merely to illustrate more clearly the relationship between the cross-sectional shape of the fish and of the guide channel.

The fish 17 shown on the left lies with its tail in the opposite direction to the direction in which the helix 1 rotates so that the tail engages in the gripper formed by the bar 3 and the support 4 and the fish is carried along. The further procedure has already been described above.

The fish 18 lies on the fish 19 in the guide channel and now slides into the preceding turn of the guide channel owing to the low height of the helix 1 at 7. The fish 20 is already in the correct head position so that its head and body can slide easily over the bar 3 or the bar can run easily under it.

As regards the belly position of the fishes 20, 19 and 21, it can clearly be seen how these fishes are gradually turned on to their bellies by the narrowing of the guide channel, independently of whether they are in the correct belly position or not. As the belly portion of the fish is curved in the longitudinal direction the setting up on the belly produces an extremely stable position on the curved support. The fishes brought on to their bellies all tip towards the same side in moving on in the feed direction, that is with their back facing the direction of feed, because they are pushed by the channel wall facing in the opposite direction to the feed.

Should by chance a fish tip in the wrong direction, the control feeler 10 becomes operative as is clearly shown in Figs. 4 and 5. The correctly placed fish 22 (Fig. 3) passes smoothly through the channel cross-section formed by the two spires of the helix 1, the support 4 and the control feeler 10 and lies without being disturbed. A wrongly positioned fish 23 (Fig. 5) cannot however pass through the channel cross-section owing to its cross-section being inverse to that of the channel, but will be carried along by the control feeler 10 until it is raised above the height of the axis of rotation and is then again returned into the orientation process at an earlier point.

The direction in which the helix rotates is indicated by the arrow 24 and the direction in which the fishes are fed by the arrow 25.

Like oriented fishes leave the device through the aperture 6 in the support 4 and can be fed from that point in any known manner either directly or by further conveyor devices to the dressing process.

I claim:

1. Device for the orientation of fishes, comprising in combination, rotary helical conveyor means forming guide channels for shifting the fish transversely to their longitudinal direction, and a stationary support carrying the fishes, the conveyor means being movable relatively to the support for the orientation of the fishes in longitudinal direction, wherein the conveyor means are interconnected by cross-bars and these cross-bars cooperate with the support forming grippers to grip the tail of fishes lying in the wrong longitudinal direction.

2. Device for the orientation of fishes, comprising in combination, rotary helical conveyor means forming guide channels for shifting the fish transversely to their longitudinal direction, and a stationary support carrying the fishes, the conveyor means being movable relatively to the support for the orientation of the fishes in longitudinal direction, wherein the height of the guide channels is lower at at least one point to deflect into a neighbouring channel fishes lying one on top of the other.

3. Device for the orientation of fishes, comprising in combination, rotary helical conveyor means forming guide channels for shifting the fish transversely to their longitudinal direction, and a stationary support carrying the fishes, the conveyor means being movable relatively to the support for the orientation of the fishes in longitudinal direction, said device further comprising at least one feeler projecting into a guide channel and forming with the walls of the channel and the support a cross-section allowing the passage of fishes lying in a certain belly position and carrying along and sorting out fishes lying in a different belly position.

4. Device for the orientation of fishes, comprising in combination, rotary helical conveyor means forming guide channels for shifting the fish transversely to their longitudinal direction, and a stationary support carrying the fishes, the conveyor means being movable relatively to the support for the orientation of the fishes in longitudinal direction, wherein the conveyor path rises in the direction of an axis extending between the point at which the fish are introduced into the device and the point at which they are sorted out, and wherein the conveyor means are interconnected by cross-bars and these cross-bars cooperate with the support forming grippers to grip the tail of fishes lying in the wrong longitudinal direction.

5. Device for the orientation of fishes, comprising in combination, rotary helical conveyor means forming guide channels for shifting the fish transversely to their longitudinal direction, and a stationary support carrying the fishes, the conveyor means being movable relatively to the support for the orientation of the fishes in longitudinal direction, said device having a longitudinal axis which rises in the direction of an axis extending between the point at which the fish are introduced into the device and the point at which they are sorted out, and wherein the conveyor means are interconnected by cross-bars and these cross-bars cooperate with the support forming grippers to grip the tail of fishes lying in the wrong longitudinal direction.

References Cited in the file of this patent

UNITED STATES PATENTS

| 1,450,145 | Ellenwood | Mar. 27, 1923 |
| 1,614,588 | Holth | Jan. 18, 1927 |
| 2,602,183 | Christiansen | July 8, 1952 |

FOREIGN PATENTS

| 77,930 | Norway | Jan. 15, 1951 |